United States Patent [19]

Kunstadt

[11] 4,189,757
[45] Feb. 19, 1980

[54] SYSTEM FOR DECODING DATA ON A MAGNETIC MEDIUM

[76] Inventor: George H. Kunstadt, 4450 La Barca Dr., Tarzana, Calif. 91356

[21] Appl. No.: 912,773

[22] Filed: Jun. 5, 1978

[51] Int. Cl.$^2$ ............................................. G11B 5/09
[52] U.S. Cl. ..................................................... 360/51
[58] Field of Search ................................. 360/39, 40, 51

[56] References Cited

U.S. PATENT DOCUMENTS

| 3,865,981 | 2/1975 | Welsh et al. | 360/51 |
| 3,944,940 | 3/1976 | Desai | 360/51 |
| 4,008,488 | 2/1977 | Osborne | 360/51 |
| 4,037,257 | 7/1977 | Chari | 360/51 |
| 4,040,022 | 8/1977 | Takii | 360/51 |

Primary Examiner—Vincent P. Canney
Attorney, Agent, or Firm—Herzig & Walsh

[57] ABSTRACT

A system for reading back data recorded as series of discrete regions of magnetization and including synchronizing data, in a magnetic medium, comprises a readback device generating read data pulses, the system further including a clock pulse generator comprising a clock pulse oscillator and circuitry for providing a Gray code signal at the output of the clock pulse generator. Read data pulse recording cicuitry connected to the readback device is responsive to data pulses and generates an output signal corresponding to the time of arrival of data pulses. An exclusive OR gate compares the output fom the clock pulse generator and the read data pulse circuitry, the output of the exclusive OR gate being connected to a negative AND gate, thereby providing a system clock based upon the clock pulse arriving at the OR gate nearest in time to a data pulse.

8 Claims, 1 Drawing Figure

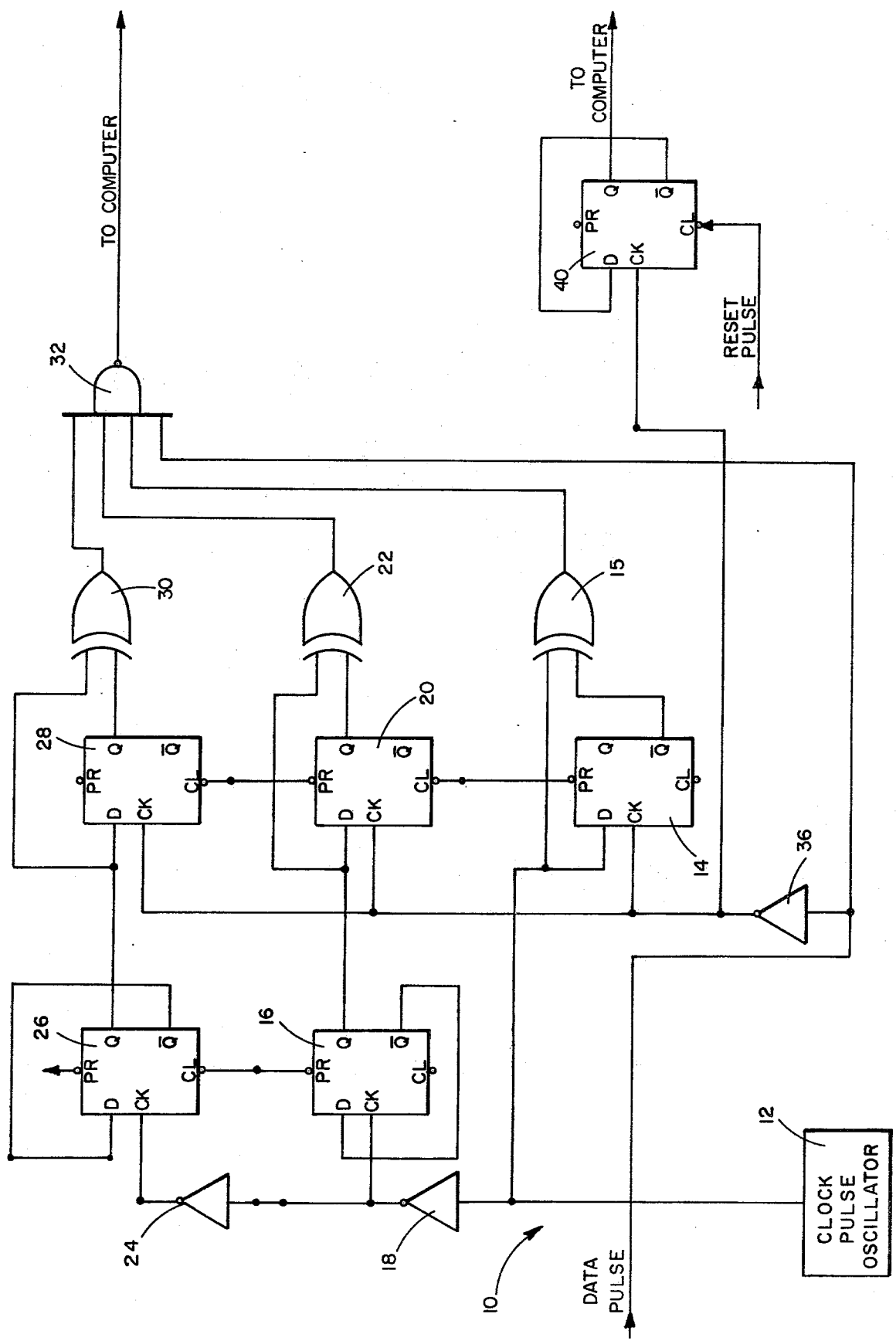

SYSTEM FOR DECODING DATA ON A MAGNETIC MEDIUM

BACKGROUND OF THE INVENTION

1. Field of the Invention

The invention pertains to systems for reading back information recorded on a magnetic medium, such as a magnetic disc or magnetic tape of the type commonly used in computer systems.

2. Description of the Prior Art

The objective of all systems and methods for recording and reading back information on magnetic medium is to record the information with the highest possible density and to read back such information with minimum error. Such information is normally recorded as regions of saturated magnetization in the north pole or south pole sense. Information is contained in the transitions from a region of one sense of saturation to a region of the opposite sense, and in the relative distances between the transitions.

The encoding schemes which are generally recognized to be the most efficient employ one transition per bit of information. A typical example of such encoding methods is one commonly called "non-return to zero" ("NRZ"). Under this scheme, a zero binary bit of information would be a region of one type of saturation and a one binary bit would be a region of the opposite sense of saturation. Thus, a change of saturation between zero and one would show up as a change of magnetization. When the magnetic medium is passed in conjunction with the readback mechanism, voltage pulses would be obtained which correspond to changes in saturation between the north and south directions. Therefore, there is no output from the readback head for a string of like bits. For this reason, to decode the digital data properly, a companion wave form comprising a series of clock pulses placed in conjunction with each bit cell is employed. In high density recording, the only reliable way to obtain a bit clock is to provide information on the data track pertaining to the bit cell boundaries. A commonly utilized method is the use of a synchronizing transition recorded at periodic, determined intervals in the data stream. The synchronizing bit is selected to be the opposite of the last data bit of the preceding bit stream. In a common application, the synchronizing information is recorded after 16 data bits so that at least one transition will occur for each group of 17 bit cells.

In existing systems, read clocks are generated from recorded transitions by synchronizing an oscillator to the transitions in a phase locked loop. To permit generation of a stable output clock and at the same time provide the capability of locking onto the control signal derived from the recorded transitions, existing systems utilize a recorded preamble to the data stream. The preamble ordinarily comprises a lengthy series of a predetermined code which generates a pattern of transitions onto which the phase locked loop can lock, provided that the preamble is sufficiently lengthy. Long preambles are undesirable because they are wasteful and diminish valuable recording space on the magnetic medium.

Therefore, there has been a felt but unfulfilled need for systems which provide full clock synchronization with only one synchronizing pulse.

SUMMARY OF THE INVENTION

A system for reading back data recorded as series of discrete regions of magnetization and including synchronizing data, in a magnetic medium, comprises readback means responsive to information on the magnetic medium to provide a readback data pulse and further comprises clock pulse means for generating clock pulses with periods of selected fractions of the data pulse period and constituting a Gray code signal. The system further includes read data pulse recording means connected to the readback means and responsive to the data pulses for recording the time of arrival thereof and providing an output signal corresponding to the time of arrival. The output of the data pulse recording means is connected to comparison means whose input is also connected to the output of the clock pulse means and whose output is connected to negative AND gate means, the system thereby selecting a clock which is initially generated one-half pulse period later than the arrival of the last data pulse and which thereafter continues in the same phase until changed by the arrival of a data pulse in a different phase.

BRIEF DESCRIPTION OF THE DRAWINGS

FIG. 1 comprises a schematic diagram of a system in accordance with the invention.

DETAILED DESCRIPTION OF A PREFERRED EMBODIMENT

A data readback system 10 includes a clock pulse oscillator 12. In the specific embodiment described and depicted herein, the frequency of the oscillator is 8 MHz. Other frequencies, of course, may be employed in accordance with the invention. The D input of a flip-flop 14 is connected to the clock pulse oscillator 12. The $\overline{Q}$ output of flip-flop 14 is connected to exclusive OR gate 15 as is the clock pulse oscillator 12 output.

Controlled by clock pulse data recorded on another track (not shown), the output of clock pulse oscillator 12 is also connected to the clock terminal of a flip-flop 16 through an inverter 18. The latter delays the basic bit clock pulse a selected duration, e.g., several nanoseconds. The Q output of flip-flop 16 is connected to the D input of a flip-flop 20. Also connected to the output of flip-flop 16 is exclusive OR gate 22, as is the Q output of flip-flop 20. The $\overline{Q}$ output of flip-flop 16 is connected to the D input of the flip-flop.

The input of an inverter 24 is connected to the output of inverter 18. The output of inverter 24 is connected to the clock terminal of a flip-flop 26. The $\overline{Q}$ terminal of the latter flip-flop is connected to the D input thereof. The Q output of flip-flop 26 is connected to the D input of a flip-flop 28, the Q output of which is connected to exclusive OR gate 30. Also connected to exclusive OR gate 30 is the $\overline{Q}$ output of flip-flop 28. The output of each exclusive OR gate 15, 22, 30 is connected to a quadruple NAND gate 32.

Read data pulses from data stored on a magnetic medium, such as a magnetic disc, (not shown) are received at the input of an inverter 36, the output of which is connected to the clock terminals of flip-flops 14, 20, 28, respectively. Also connected to the output of inverter 36 is the clock terminal of a flip-flop 40, the output of which is connected to a computer (not shown) for processing the output data pulses. Prior to the arrival of the stream of data pulses, flip-flop 40 is cleared to "zero". The output of quadruple NAND gate 32 is connected to a computer (not shown).

In operation, the basic bit clock is generated by oscillator 12 and delayed in inverter 18 then counted down by a factor of 2 to generate a 4 NHz wave shape at the Q output of flip-flop 16. The 8 MHz wave shape is further inverted by inverter 24 and counted down to 4 MHz at flip-flop 26. The clock pulse at flip-flop 14, of course, is at the 8 MHz frequency. As a result, a "Gray" code signal appears at the D inputs of flip-flops 14, 20, and 28, respectively. The delays are selected so that there will be a transition on one of the Gray code lines every 33.2 nanoseconds, for the 8 MHz basic clock pulse frequency.

The read data pulses are of uniform length and are separated by multiples of the basic pulse period. In the present specific embodiment, where the clock frequency is 8 MHz, with a 16 character data stream having a 17th synchronizing character, the pulse period for a transition between successive data bits is 250 nanoseconds or a multiple thereof. Thus, the pulses at the input of inverter 36 may range from the 250 nanosecond period to a maximum of 4 microseconds, the latter corresponding to a series of 16 bits without a transition and comprising the transition between the last data bit and the synchronizing bit.

The flip-flops 14, 20, 28 are actuated by the rising edge of the clock pulse. As each data pulse appears at the output of inverter 36, its rising edge will trigger the flip-flops 14, 20, 28 and lock into their Q outputs the instantaneous state of their D inputs. In this manner, immediately after the rising edge of each data pulse, a "Gray" code pattern is recorded on flip-flops 14, 20, and 28, the Gray code pattern signifying the time of arrival of the data pulse. The outputs of flip-flops 14, 20, and 28 are continuously compared in the three exclusive OR gates 15, 22, 30, respectively, with the changing D inputs of the respective flip-flops 14, 20 and 28.

The three comparison signals from the exclusive OR gates 15, 22, 30 are connected to the input of NAND gate 32. Because exclusive OR gates 22, 30 compare D signals with Q signals and exclusive OR gate 15 compares a D signal with a $\overline{Q}$ signal, a negative output pulse will appear at the output of NAND gate 32 at a time nominally 125 nanoseconds after the leading edge of the read data pulse. Because the process is one of "optimum fit", there may be a small error in the generation of the output pulse; however, this error has been found to be minimal and acceptable. The fourth input to NAND gate 32, from the $\overline{Q}$ output of one shot 34 is provided to suppress possible switching transients.

If, after the "time of arrival" flip-flops 14, 20, 28 are locked in their Q outputs, no read data pulse appears for the next four microseconds (corresponding to a bit stream without transitions, i.e., all "zero's" or all "one's"), the flip-flops will not be re-triggered and the time of arrival will stay locked in the Q outputs. Fifteen additional pulses will appear at NAND gate 32, each one approximately 33.2 nanoseconds in length. Thus, the read clock is chosen from one, in effect, of eight available bit clocks, phased 45° apart. The read clock is instantly selected upon arrival of a single readback data pulse, and every readback pulse contributes to a new "optimum fit" selection which is locked in until the arrival of the next readback data pulse. Thus, no long preamble is required in the data stream and any one data pulse is sufficient to facilitate selection of an "optimum fit" read clock. The embodiment described and depicted is based upon the selection of one out of eight available read clocks. As will be obvious to one skilled in the art, however, this number is not mandatory. In systems in accordance with the invention, selection may be one of any number of clocks, with accuracy increasing with increase of the number. Thus, a pulse train is generated suitable for use as a read clock since it is placed nominally at the center of each possible bit cell.

The clock pulse from NAND gate 32 passes to the read clock output in the computer (not shown). Pulse stretching means may be employed, in particular applications, between NAND gate 32 and the computer.

A flip-flop 40 regenerates the NRZ data stream at its $\overline{Q}$ output. The flip-flop 40 is originally reset to "zero" from reset information on another track (not shown). There is a read data pulse for each transition between "zero" and "one". Each read data pulse actuates the clock input of flip-flop 40 to cause the Q output to change from "zero" to "one" or vice versa with each arrival of a new clock pulse. Read data pulses and read clock pulses having been generated, the computer samples the read data line with each read clock and determines whether each bit is supposed to be a "zero" or a "one".

Thus, a system has been provided for effecting full clock synchronization in data readback with only one synchronizing pulse. Though a particular embodiment has been depicted and described hereinabove, the invention is defined solely by the appended claims interpreted in light of the specification and drawings.

What is claimed is:

1. A system for reading back data recorded as series of discrete regions of magnetization and including synchronizing data, in a magnetic medium, comprising:
   readback means responsive to information on said magnetic medium to provide a read data pulse having a selected period;
   clock pulse means for generating clock pulses having substantially constant periods comprising a selected fraction of said data pulse period and comprising a Gray code signal, the output of said clock pulse means being connected to comparison means;
   read data pulse recording means connected to said readback means and responsive to a data pulse for recording the time of arrival of the latter and providing an output signal corresponding to said time of arrival plus one-half of said period of said read data pulses, said data pulse recording means output being connected to comparison means; and
   comparison means connected to the output of said clock pulse means and to the output of said data pulse recording means, for comparing output from said clock pulse means and output from said data pulse recording means whereby a clock pulse is selected for the system.

2. The invention as set forth in claim 1 wherein said data pulse recording means includes means for providing a Gray code signal output.

3. The invention as set forth in claim 1 wherein said Gray code signals generated by the clock pulse means and said data pulse means have a substantially constant period which is substantially equal to one-eighth of the period of the data pulses.

4. In a system for reading back data recorded as a series of discrete regions of magnetization in a magnetic medium and including synchronization information, the data having a selected period and further including readback means responsive to data and synchronizing information on said magnetic medium, the improvement comprising:

clock pulse means for providing a Gray code signal, the latter having a period comprising a selected fraction of the period of said data;

data pulse recording means responsive to a data pulse from readback means, for recording the time of arrival of a data pulse and providing an output signal corresponding to said time of arrival plus one-half of said period of said read data pulses;

selection means connected to said data pulse recording means and to said clock pulse means for selecting a clock pulse corresponding to the time of arrival of the nearest data pulse.

5. The invention as set forth in claim 4 wherein said selection means comprises comparison means connected to the output of said data pulse recording means and to the output of said clock pulse means for comparing the signals at said outputs and further includes a NAND gate connected to the output of said comparison means.

6. The invention as set forth in claim 5 wherein said comparison means comprises exclusive OR gate means.

7. A system for reading back data recorded as series of discrete regions of magnetization and including synchronizing data, in a magnetic medium, comprising:

readback means responsive to information on said magnetic medium to provide a read data pulse having a selected period;

clock pulse means for generating clock pulses having substantially constant periods comprising a selected fraction of said data pulse period and comprising a Gray code signal, said clock pulse means including oscillator means having a frequency substantially equal to the data pluse frequency and the output of said clock pulse means being connected to comparison means;

read data pulse recording means connected to said readback means and responsive to a data pulse for recording the time of arrival of the latter and providing an output signal corresponding to said time of arrival, said data pulse recording means comprising first flip-flop means, second flip-flop means, and third flip-flop means and further including means connected between said oscillator and said first flip-flop means, second flip-flop means, and third flip-flop means to reduce the frequency of the clock pulse at the input of said second and third flip-flop means to substantially one-half of the data pulse frequency, the clock pulse frequency of said first flip-flop means remaining unchanged;

comparison means connected to the output of said clock pulse means and to the output of said data pulse recording means, for comparing output from said clock pulse means and output from said data pulse recording means whereby a clock pulse is selected for the system; and negative AND gate means connected to the output of said comparison means.

8. In a system for reading back data recorded as a series of discrete regions of magnetization in a magnetic medium and including synchronization information, the data having a selected period, and further including readback means responsive to data and synchronizing information on said magnetic medium, the improvement comprising:

clock pulse means for providing a Gray code signal having a period comprising a selected fraction of the period of said data, said clock pulse means comprising clock pulse oscillator means for generating clock pulses having a period equal to that of the period of the data information and further including first flip-flop means, second flip-flop means, and third flip-flop means, the clock input of said first flip-flop means being connected to said clock pulse oscillator means, and further including first delay means and second delay means, the input of said first delay means being connected to said clock pulse oscillator means and the output of said first delay means being connected to the clock terminal of said second flip-flop means, said first delay means and said second delay means being connected in series, the output of the latter being connected to the clock terminal of said third flip-flop means;

data pulse recording means responsive to a data pulse for readback means, for recording the time of arrival of a data pulse; and selection means connected to said data pulse recording means and to said clock pulse means for selecting a clock pulse corresponding to the time of arrival of the nearest data pulse, said selective means comprising comparison means connected to the output of said data pulse recording means and to the output of said clock pulse means for comparing the signals at said outputs and further including NAND gate means connected to the output of said comparison means.

* * * * *